3,488,034
HIGH DUTY CONTROL AND STOP VALVES
Henry Masheder, London, England, assignor to Masheder Design Studies Limited, London, England
Filed Oct. 30, 1967, Ser. No. 679,057
Claims priority, application Great Britain, Apr. 14, 1967, 17,214/67
Int. Cl. F16k 25/00, 3/00
U.S. Cl. 251—204                     3 Claims

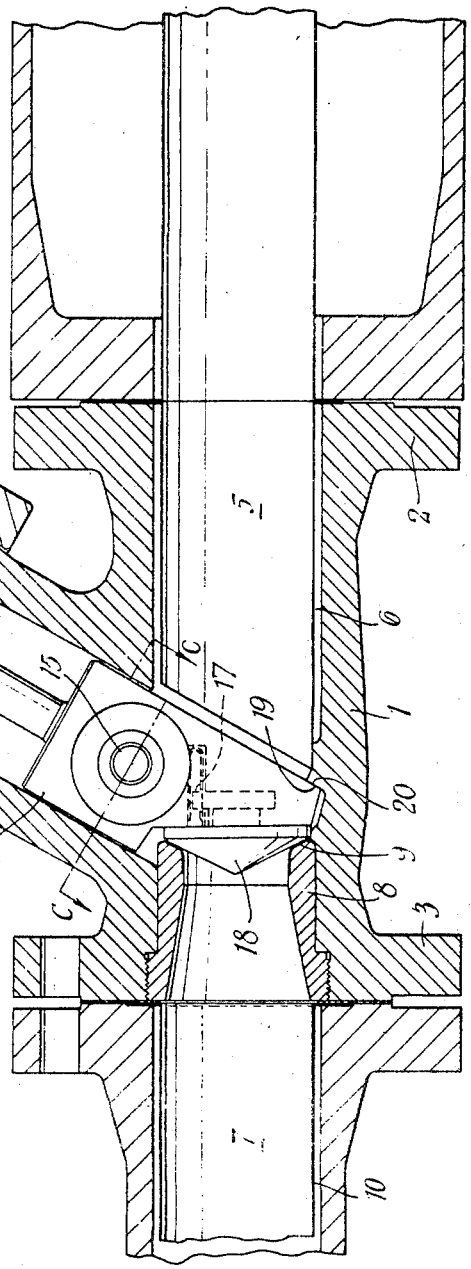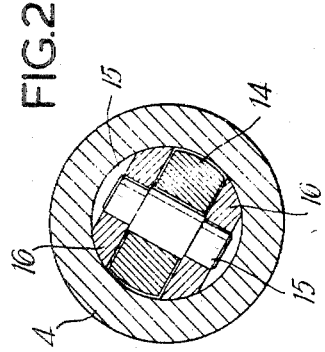
INVENTOR
HENRY MASHEDER

ABSTRACT OF THE DISCLOSURE

The invention provides a control valve in which the closure member is carried with a degree of transverse freedom by a stem which traverses the valve bore at an angle from the guide tube to meet an abutment on the opposite side of the bore so that the stem transmits an axial thrust to the closure member and forms a complete supporting bridge for the closure member in its closed position.

---

This invention concerns improvements in high duty control valves and its object is to provide more highly effective and cheaper valves than hitherto available.

Valves in accordance with the invention are intended for high pressure service in the control of gases and liquid, particularly where differential pressures across the valve are high and where the use of compressible fluids causes sonic and supersonic flow on the downstream side together with the generation of shock waves.

Earlier designs of valves aimed at solving these problems, sought to achieve a straight-through flow pattern under maximum open conditions. Among these are the P. K. Paul valve of American origin and the many variations around this principle. Another is an earlier design of the present inventor which employs a tangential locus system in which a spherical or part-spherical element is translated at an angle to flow and is tangential to the conical seat with which it engages.

Although the latter is a significant advance on previous systems, if designs embodying that invetnion are badly executed either by the design detail or the manufacturer then the valve can, under certain circumstances, become self-jamming and this can have disastrous consequences when in use on critical power station duties.

According to the invention I provide a high duty control valve in which a closure member is carried captive with a degree of transverse freedom in the forward end of a guided operating stem entering a fluid flow bore at less than a right angle thereto from the upstream side, the upstream face of the said stem abutting at least one contact face formed within the bore to transmit an axial thrust to the closure member against a valve seat and form a fully supported bridge across the bore when in the closed position.

In preferred forms of control valve the operating stem is supported by hard faced rollers within a cylindrical guide.

Non-regulating valves i.e. stop valves do not all need the roller system.

The closure member or valve head may be of shallow conical formation so as to make an effective seal with any size of seat, and the valve seat may be formed at the mouth of a venturi nozzle fixed within the valve bore. The throat of the nozzle may be approximately 70% to 100% of the full flow bore urea.

It is preferred to mount the valve head in a T slot milled in the operating stem at right angles to the bore of the valve with little or no freedom in the direction of fluid flow.

Transverse freedom however, is permitted to a limited extent and the engaging surfaces at the base of the T slot permit the thrust of the valve spindle to be converted to an axial thrust on the stationary valve head normal to the seat surface such that the force from the spindle is amplified as a form of breech-lock.

The valve head is preferably of only very slightly less diameter than that of cylindrical guide and is mounted in the operating stem so as to lie on the centre line of that guide. The valve head is thus prevented from movement relative to the stem by its contact with the guide wall.

One of the limitations with the previous designs of valve has been that they were incapable of sustaining reversed pressures since they could not be adequately supported by the ball and clevis system employed. The breechlock principle enables the valve shaft to form a beam supported at both ends whilst the centre engages the full reactive load arising from the reversal of pressure on the valve.

It follows that in the present arrangement considerable security is obtained, and the closing forces on the valve spindle are distributed uniformly over large surfaces of the valve head and over large surfaces of the valve body. This is quite unlike the earlier systems in which the reactive thrust is carried on the valve spindle itself and as a consequence large bending moments are applied in which the support system represents a simple cantilever.

It is well known that whereas a cantilever beam suffers a bending moment of the order of X, a double supported beam carries a bending moment of approximately $\frac{1}{8}$X. The result is that the stress levels are very much reduced, whilst the proportions of the valve remain the same. Another difficulty which is overcome by this invention is that, whereas the spherical system introduces problems both of manufacture and of regulation, the valve head of the present device may be turned in the lathe, and may have a variety of seating surfaces whether spherical, conical or flat without detriment to the principle described.

The angle of inclination of the operating stem to the valve axis may be varied within wide limits and may approach the perpendicular. At an angle of 75° to the valve axis the force to be applied to the operating stem to open the valve against a given fluid pressure would be only one quarter of that applied by such pressure to the valve head since sin 15° is 0.25.

It is well known that in control valves the primary problem is one of shock waves on the down-stream side from valve. In order to prevent galling it is desirable to cary the large differential forces in such a way as to prevent the slidiing of high temperature metal. In a preferred form of this invention it is achieved by providing a pair of rollers which travels the inclined cylindrical guide of the operating stem, and when the valve is regulating the entire thrust is taken and distributed uniformly automatically onto the surface of that guide. The rollers are part spherical, and thus permit considerable rotational displacement if required to insure that the valve head seats effectively and makes a tight joint, notwithstanding thermal and other physical changes which occur under pressure and temperature use.

The rollers can be mounted in low friction bearings for conventional use and may also be mounted in high temperature roller bearings to give virtually frictionless operation even under very high load conditions.

The use of a pair of rollers extending on both sides of the centre line of the guide or cross-head provides a very effective means of eliminating this metal to metal sliding friction and consequent galling, since the same roller or rollers which carry the down-stream load effect when the valve is regulating, change position automatically to become an upstream surface retainer, therefore making possible a force amplifying system in which both of the critical surfaces have a rolling and not a sliding action. This means that the disengagement of the valve from the seat is made much easier and the servo-mechanism used can be much smaller and cheaper. It also means that the valve can be used for upstream or downstream flow without detriment either to its tightness or to its ability to regulate without galling or seizure.

The above and other features of the invention are embodied in one preferred form of valve which will now be described by way of example with reference to the accompanying drawings in which:

FIG. 1 is a central vertical section through a high duty valve.

FIG. 2 is a section on the line C—C of FIG. 1.

The valve is designed to control an air flow at a pressure of 700 p.s.i. (temporary overpressure 1000 p.s.i.) flowing through a lined 4" internal diameter pipe line at a maximum temperature of 600° C.

The valve body 1 is a steel casting providing a straight-through passage from an inlet flange 2 to an outlet flange 3 and a massive cylindrical guide 4 entering the passage at a slope of 60° towards the inlet flange.

The inlet section 5 of the valve passage is 4" inside diameter and is fitted with a 3⅝" liner 6 extending from the inlet flange 2 to very near the entry point of the sloping guide 4.

The outlet section 7 of the valve passage is some 5/32" less in diameter than the inlet section and is fitted with a venturi nozzle 8 of 2½" throat diameter screwed into the face of the outlet flange 3.

The nozzle 8 is 4" in length and its mouth 9 which is stellited or otherwise hardened to form the valve seat extends about ½" beyond the entrance of the guide 4, while its exit end diverges smoothly to the diameter of the liner 10 of the pipe line.

The cylindrical guide 4 has an internal diameter of 3⅝" and is flanged at its outer end for reception of the yoke 11 of a gland-bridge 12 or pressure lock connection.

An operating stem 13 passing through the pressure lock and connectible to a pneumatic or like actuator carries at its opposite end a cross-head 14 which is about 1½" wide and is a loose sliding fit within the guide 4.

A pin passed through the centre of the cross-head 14 provides oppositely extending stub axles 15 for a pair of part spherical, hard faced guide rollers 16.

The guide rollers may be fitted with roller bearings to minimise friction, but in any case are designed to transmit all side thrust from the cross-head 14 to the internal wall of the cylindrical guide 4.

The forward or downstream face of the cross-head 14 is cut back to provide a smooth face perpendicular to the axis of the valve passage 5, 7. A T slot 17 milled in this face receives and holds captive the stem of a shallow conical valve 18.

The valve is permitted a small degree of movement up and down the smooth face of the cross-head 14 but has a minimum front to back clearance.

In the closed position of the valve (as shown in FIG. 1) the rear or upstream outer extremity 19 of the cross-head 14 engages with an abutment face 20 having a 60° slope which is formed in the wall of the inlet section 5 of the valve passage diametrically opposite the entry position of the upstream wall of the cylindrical guide. Thus the cross-head forms a fully supported bridge spanning the inlet passage when the valve 18 is closed.

The particular valve described above is subject to a force of just on 5000 lb. from air pressure at 1000 p.s.i. when closed, yet it requires only half this force to open the valve, neglecting gland friction.

I claim:

1. A high duty control valve in which a closure member is carried captive with a degree of transverse freedom in the forward end of a guided operating stem entering a fluid flow bore at less than a right angle thereto from the upstream side, the upstream face of the said stem abutting at least one contact face formed within the bore to transmit an axial thrust to the closure member against a valve seat and form a fully supported bridge across the bore when in the closed position, said operating stem being supported by hard faced rollers within a cylindrical guide.

2. A valve assembly comprising, in combination,
a body having an axial fluid passage therethrough,
valve seat means within said passage presenting an annular valve seat,
said body having a bore intersecting said passage, said bore having an axis inclined at an acuate angle with respect to the axis of said passage and said body having an abutment surface facing said valve seat at that side of said passage opposite to the intersection of said bore and said passage,
guide means axially movable in said bore between extended and retracted positions and including bearing means continuously engaged during such movement with the surface of said body defining said bore, said guide means including an end portion engaging said abutment surface when said guide means is in its extended position whereby said guide means is bridged across and is supported at opposite sides of said passage when so extended, said guide means also having a reaction face parallel to said valve seat and disposed in spaced opposing relation thereto when said guide means is in extended position,
and a valve member caried by said guide means for centering movement relative thereto substantially only in a plane parallel to said reaction face, said valve member having a face on one side engaging with said valve seat and a face on its opposite side engaging said reaction face when said guide means is in its extended position, said bore being of circular cross section, said guide means being in the forms of a block loosely fitted within said bore, and said bearing means comprising a stub shaft carried by said block and positioned with its axis transverse to said bore, and roller means carried by the opposite ends of said stub shaft and engaging the surface of said bore.

3. The valve according to claim 2 wherein said reaction face is provided with a T-slot and said valve member is provided with a stem engaged in said T-slot for limited movement of said valve member with respect to said guide means in said plane along the line defined by the intersection of said plane and a plane containing the axes of said passage and said bore.

References Cited
UNITED STATES PATENTS
1,280,451  10/1918  Hagen _____ 251—326 X

FOREIGN PATENTS
740,756  8/1966  Canada.
761,311  1/1934  France.

ARNOLD ROSENTHAL, Primary Examiner

U.S. Cl. X.R.
251—326